United States Patent [19]

Zupancic

[11] 3,922,530

[45] Nov. 25, 1975

[54] MAGNETIC STRIPE READING HEAD

[75] Inventor: Anton Z. Zupancic, Cleveland, Ohio

[73] Assignee: Addressograph Multigraph Corporation, Cleveland, Ohio

[22] Filed: Apr. 19, 1974

[21] Appl. No.: 456,028

Related U.S. Application Data

[63] Continuation-in-part of Ser. No. 256,231, May 24, 1972, abandoned.

[52] U.S. Cl. ..... 235/61.11 R; 235/61.11 D; 274/4 J; 310/156; 360/81

[51] Int. Cl.² ..................... G06K 7/15; G11B 19/24; H02K 21/12; G06K 13/08

[58] Field of Search ............ 360/73, 107, 101, 103, 360/105; 235/61.11 R, 61.11 D, 61.11 E; 74/572; 242/55.17, 200; 250/570; 274/4 A, 4 J; 310/156

[56] References Cited

UNITED STATES PATENTS

| | | | |
|---|---|---|---|
| 1,728,304 | 9/1929 | Pfannenstieal | 274/5 R |
| 2,577,190 | 12/1951 | Hare | 360/73 |
| 2,678,821 | 5/1954 | Masterson | 360/73 |
| 2,965,721 | 12/1960 | Hollabaugh | 360/103 |
| 2,994,746 | 8/1961 | Collier | 274/4 J |
| 3,559,999 | 2/1971 | Perkins | 360/101 |
| 3,583,709 | 6/1971 | Dollenmayer | 274/4 A |

*Primary Examiner*—Daryl W. Cook
*Assistant Examiner*—Robert M. Kilgore
*Attorney, Agent, or Firm*—Ray S. Pyle

[57] ABSTRACT

The specification and drawings disclose an apparatus particularly suited for reading the magnetic stripe on a credit card. The disclosed apparatus includes a magnetic reading head mounted on a driven carriage. The carriage is driven by a lead screw drivingly connected with a synchronous motor. The drive connection between the lead screw and the motor includes a first, light-weight pulley carried on the motor shaft and a second relatively heavy pulley-flywheel combination carried on the lead screw. A resilient elastic belt drivingly interconnects the two pulleys. It should be carefully noted that the motor pulley is insignificant in weight and does not serve as a flywheel.

8 Claims, 13 Drawing Figures

MAGNETIC STRIPE READING HEAD

This application is a continuation-in-part of Ser. No. 256,231, filed May 24, 1972, now abandoned.

The subject invention is directed toward the art of data reading or recording devices and, more particularly, to apparatus of the general type used for processing credit cards.

The invention is especially suited for use as a magnetic stripe credit card reader and will be described with particular reference thereto; however, as will become apparent, the invention is capable of broader application and could be adapted to optical or piezo-electric credit card reading, as well as magnetic card recording.

Reading of a magnetic stripe credit card requires very precise relative movement between the credit card and a magnetic reading head. Not only must the relative velocity between the card and the head be constant but, also, the orientation of the head relative to the magnetic stripe must be uniform within extremely narrow limits. Further, the spacing between the head and the stripe must be constant.

The general difficulties involved in satisfying the above requirements are compounded by the nature of the typical credit card. First, the card is often bowed. Thus, means must be provided to hold the card flat or, alternately, the relative motion must take place along a curved path such as by constraining the head to follow the card surface. Secondly, the magnetic stripe itself may have irregularities in addition to the bow or curve of the card. Consequently, the head must be capable of shifting in the strip to follow the irregularities.

BACKGROUND OF THE INVENTION

The logical approach to irregular drive condistions of an electric motor drive is to use a flywheel inertia mass.

A synchronous motor is usually considered to be a uniform speed motor, but the rotation velocity of a synchronous motor actually follows the cycle of the power supply.

Logically, a flywheel will dampen out such "gearing" as this characteristic is termed. But a synchronous motor is very poor in starting torque. Hence any useful mass and driven load will stall a motor of reasonable power size for a specific drive load.

Most current card reading devices attempt to overcome the above-discussed problems by use of card transport systems which move the card past a stationary reading head. In order to achieve the extremely uniform velocities needed, the drives for the systems become relatively complex. Similarly, the reading head mountings are somewhat complex in that they typically comprise a multiple pivot mounting assembly arranged so that the head can have the limited freedom of movement necessary for proper tracking in the magnetic stripe.

As a consequence of the above, currently available card reading devices are expensive and sometimes difficult to maintain.

The subject invention satisfies the noted design criteria with a system which is particularly simple and inexpensive. Broadly, in accordance with one aspect, the invention contemplates a device of the general type described wherein relative motion between the card and the reading or writing head is produced by a drive system which includes a synchronous electric motor connected through a first relatively low inertia pulley and an elastic belt to a second pulley and flywheel combination which is connected with the driven member. Preferably, the driven member is a lead screw which causes traversal of a carriage block that carries the writing or reading head past the card.

Irrespective of the type of driven member used, the drive train combination comprising the synchronous motor, low inertia pulley, elastic belt and pulley-flywheel allows the motor to start and to "gear", and nevertheless produces an extremely constant velocity output. Moreover, synchronous speed of the motor is achieved very quickly. The reason for this is that upon start-up, the belt between the pulley and the pulley-flywheel stretches. The pulley-flywheel then catches up to full synchronous speed a fraction of a second later. The elastic belt and pulley-flywheel further serve to dampen out gearing cycles from the drive motor.

The disclosed apparatus also provides an arrangement for holding the magnetic stripe in a single plane during a reading or writing operation even though the card itself is not flat. There is preferably accomplished by the provision of means which bend of deflect the card about an axis generally parallel to the magnetic stripe. The deflection is such as to cause the side of the card on which the magnetic stripe appears to be slightly convex. The means can take different forms but is preferably a groove or recess into which a longitudinal edge of the card is inserted. Spaced from the groove is a surface which acts to deflect the card about its longitudinal axis. Thus, causes the magnetic stripe to be biased downwardly and held in a single plane.

As is apparent from the foregoing, the primary object of the invention is the provision of a card writing or reading apparatus which is especially simple in construction and operation.

A further object is the provision of an apparatus of the type described wherein the drive train allows the drive motor to attain synchronous speed while under substantially no load at the moment of start.

The above and other objects and advantages will become apparent from the following description when read in conjunction with the accompanying drawings wherein.

This specification teaches the use of a synchronous motor operating with natural velocity fluctuation; a mass controlled work load, and; an energy leveler drive interconnection. This in contrast to the normal attempt to level velocity variation by a mass controlled at the motor shaft.

Figure 1:
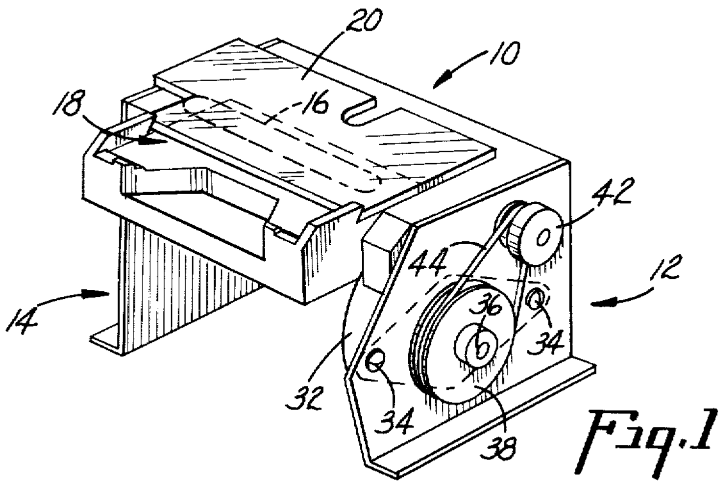
FIG. 1 is an overall pictorial view of a credit card reading apparatus formed in accordance with the preferred embodiment of the invention.

Referring more particularly to the drawings wherein the showings are for the purpose of illustrating a preferred embodiment of the invention only, and not for the purpose of eliminating the same, FIG. 1 shows the overall arrangement of the preferred form of the invention comprising a first housing or support member 10 which is suitably supported from a pair of end plates 12 and 14. The housing 10 includes an elongated slot 16 associated with a credit card receiving pocket or recess 18. The details of the credit card receiving pocket 18 will subsequently be described in some detail. For the present, however, it is sufficient to note that the pocket 18 and the slot 16 are covered by a transparent glass or plastic plate member 20 which is removably connected to the housing 10 in any convenient manner.

A magnetic reading head assembly is carried beneath slot 16 and arranged to traverse back and forth at the proper location for reading the magnetic stripes on a credit card positioned in recess 18. As is well-known and as was mentioned earlier, the relationship between the magnetic stripe and the reading head is particularly sensitive. Moreover, the reading head must traverse the magnetic stripe at a constant and closely controlled velocity.

Figure 3:
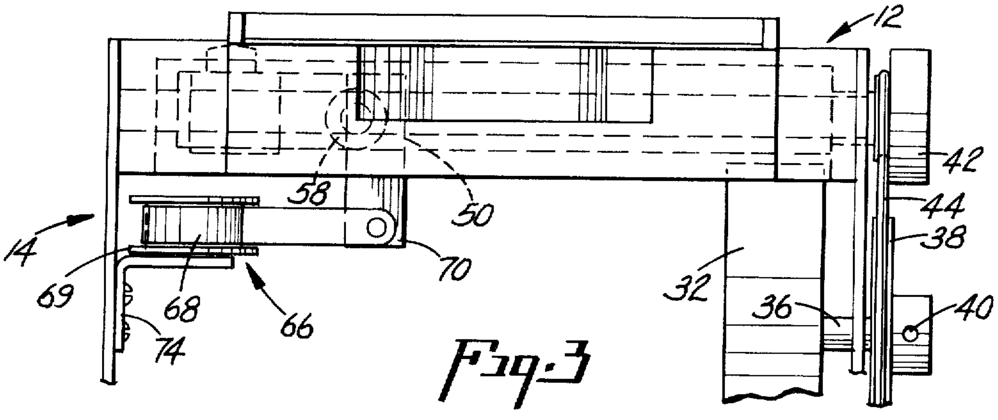
FIG. 3 is an elevational view taken on line 3—3 of FIG. 2.
Figure 4:
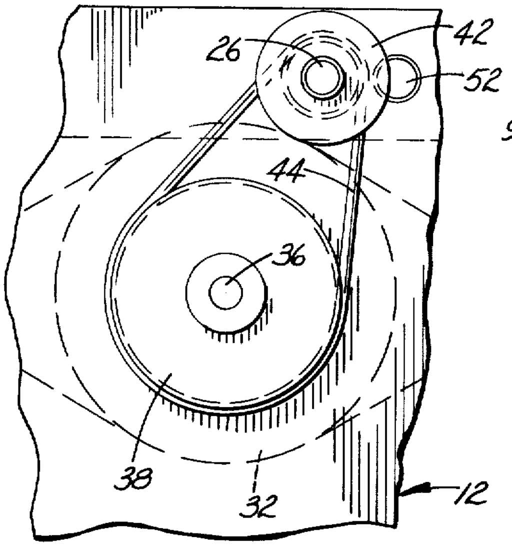
FIG. 4 is an elevational view taken on line 4—4 of FIG. 2.

Drive assembly 24 includes a lead screw member 26 which extends through the housing 10 and has its opposite ends rotatably mounted in suitable bearings 28 and 30. According to the subject invention the lead screw 26 is driven at a closely controlled and exact velocity by a small synchronous motor 32. Motor 32 is mounted from end plate 12 in any convenient manner such as through the use of a pair of small bolts 34 (see FIG. 1). The output shaft 36 of motor 32 extends through the end plate 12 and has a thin, lightweight pulley 38 carried thereon. Pulley 38 is preferably releasably connected to shaft 36 such as by a set screw 40 (see FIG. 3).

Figure 8:
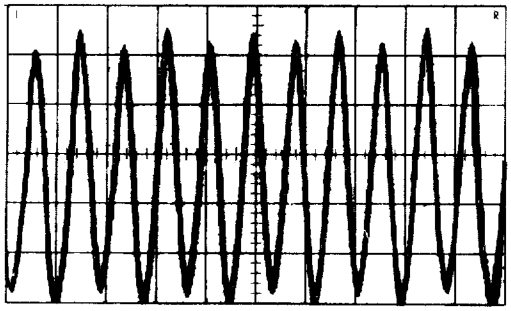
FIG. 8 illustrates an oscilloscope recording of the shaft speed velocity change in a fractional horsepower synchronous motor as used to drive the apparatus of FIG. 1.

FIG. 8 is a photograph of an oscilloscope screen with a shaft encoder attached directly to the synchronous motor shaft without load. That is, without the balance of the driven apparatus connected thereto.

Figure 9:
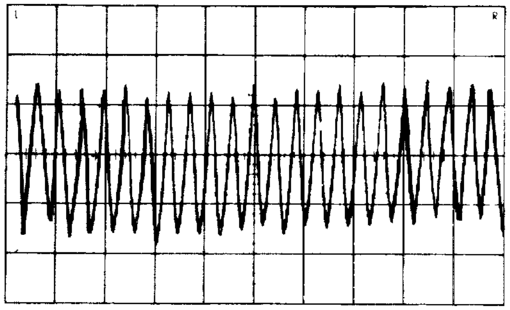
FIG. 9 is the recording with a flywheel mass attached to the motor shaft.

A synchronous motor, usually considered to be a very uniform and fixed velocity motor, actually is much like a stepping motor in many characteristics. For example, a 24 pole synchronous motor, as used in the preferred embodiment of the invention illustrated, will oscillate as shown in FIG. 8 in speed of rotation. Measuring from the original photograph from which the FIG. 8 was made reveals a percentage variation in velocity of ± 26.6% from pole to pole. The logical assumption is that if a heavy flywheel is employed on the end of the synchronous motor shaft rather than the lightweight pulley specified by this invention, there would be less amplitude velocity change. This assumption is correct as shown in FIG. 9. The scale on the oscilloscope had been changed when FIG. 9 was taken, but the relative amplitudes of velocity change are just as readily claculated. FIG. 9 shows a percentage of velocity change of ± 5.97 from pole to pole.

The difficulty, however, was found when a sufficiently large flywheel is employed on the end of the synchronous motor to dampen the oscillations, and the load of the drive screw 26 applied, the motor will stall. Hence, the logical solution produces an inoperative device.

Figure 2:
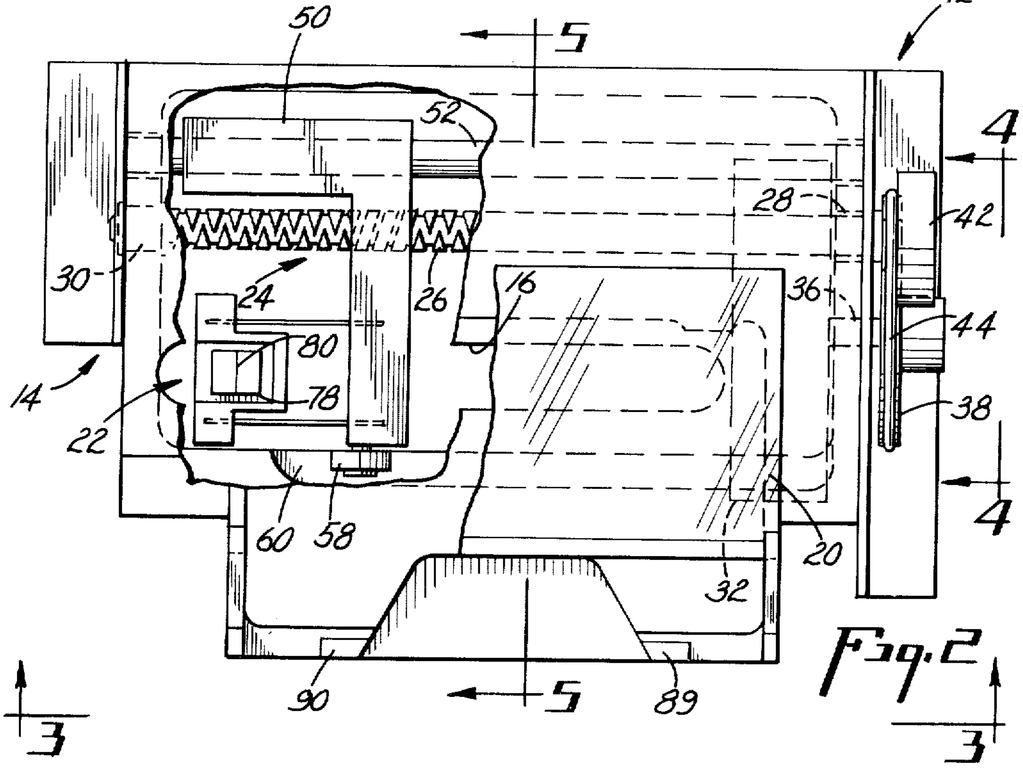
FIG. 2 is a top plan view with portions broken away to show certain details more clearly.

Carried on the outer end of lead screw 26 is a flywheel-pulley assembly 42. As best shown in FIG. 2 the pulley portion of flywheel-pulley assembly 42 is aligned with the lightweight pulley 38 carried on the shaft 36 of motor 32. A belt member 44 extends about pulleys 38 and 42 to provide a driving interconnection. According to the subject invention, belt 44 is formed from a resilient, relatively elastic material such as rubber, neoprene or the like. In particular, in the subject embodiment, belt 44 comprises a commercially available 0-ring which is stretched about the two pulleys. This arrangement provides certain distinct advantages. First, as described, synchronous motors have variable outputs known as gearing. Secondly, there is a time lag between motor start-up and the point at which they reach synchronous speed. The pulley-flywheel and resilient belt assembly of the subject invention overcomes these problems. First, upon start-up the tensioned run of the belt 44 will stretch slightly. Energy is thus stored in the belt. Thereafter, the continued power input by the motor plus the stored energy of the belt causes an immediate rapid rotation of the flywheel-pulley 42 and the lead screw 26. It has been found that this arrangement permits synchronous speed of the motor to be attained in approximately 10 milliseconds and the pulley-flywheel catches up to constant speed a fraction of a second later. Moreover, the relatively heavy mass of the pulley-flywheel combination tends to resist any instantaneous velocity changes that may result from friction in the system. As a result, synchronous speed is achieved very rapidly and the lead screw speed is extremely constant.

Figure 10:
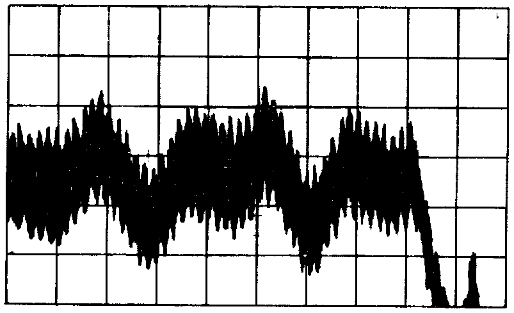
FIG. 10 is the recording of the synchronous motor connected by a flexible drive band to the pulley of a lead screw device shown in FIG. 2.

Another factor which was found to be important, but not essential, is to place a steady load on the drive synchronous motor after it reaches operative speeds. As previously indicated, the type of synchronous motor used indicates that the motor cannot start loads rigidly attached to the shaft much larger than the moment of rotational inertia. Therefore, the lightweight pulley is attached and then a flywheel is placed on the head drive screw. But, once the synchronous motor gets started and brings the flywheel into full rotational speed, the two operate pretty much in harmony and the load is materially reduced on the synchronous motor. At this point a load can be accepted. In FIG. 10, the oscilloscope indicates a wide fluctuation in speeds when attached to the shaft of the lead screw but no load placed on the lead screw.

Lead screws are not capable of being manufactured with such close tolerances that a follower in the screw will not have a degree of free movement, generally referred to as 'play'. Accordingly, if a spring action, referred herein as a negator, is placed on the driven member to urge that member in one direction only, then it will produce a uniform load for the apparatus and also eliminate any tendency for the driven member to oscillate with respect to the screw because of play.

Referring again to FIG. 2 it will be seen that an L-shaped carriage member 50 is slidably mounted on a shaft 52 which is suitably supported between the end plates 12 and 14. The shaft 52 is closely and slidably received in an opening formed through the leg of carriage 50. The carriage 50 is further supported during its sliding movement by a roller member 58 which rides on a track 60 formed across the housing 10 (see FIGS. 2 and 5). The carriage 50 is driven from lead screw 26 in the manner best seen in FIGS. 2 and 7. As shown, lead screw 26 passes through the carriage 50 and is drivingly connected therewith by a groove follower member 62 which is rotatably received in an opening formed inwardly from the bottom of carriage 50. The follower member 62 is maintained in engagement with the lead screw while being free to rotate about a vertical axis by a bracket 64 removably connected to the undersurface of the carriage 50 by a screw or the like 65. Thus, rotation of the lead screw causes the carriage to traverse beneath the slot 16. It should be understood that suitable stop-start switches (not shown) are associated with the unit for energizing and de-energizing the motor 32.

In order to eliminate the effects of any loose fit between the carriage 50 and the lead screw 26, a negator spring assembly 66 is provided to continually maintain the carriage under a bias relative to the lead screw. Additionally, this serves to maintain a continuous load on the motor. In the subject embodiment, the negator spring assembly 66 includes a coil spring member 68 which has one end connected to a roller 69 and its opposite end connected to a downwardly extending leg 70 on bracket 64. The roller 69 is mounted from a pivot shaft suitably supported from a bracket 74 connected to the side plate 14 in the manner shown.

Figure 11:
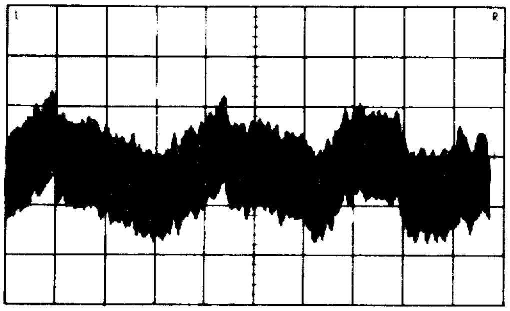
FIG. 11 is the recording of the same equipment of FIG. 10, but with a load applied to the drive screw.

FIGS. 10 and 11 illustrate the effect of the negator spring assembly 66. In FIG. 10 there is a wide swing of velocity in the driven shaft. This is a representation of the shaft as measured by the oscilloscope with no negator load and a soft spring connection. That is there is a soft 0-ring 44 employed.

FIG. 11 shows the considerable dampening effect by placing the negator assembly 66 into action. This illustrates, then, the advantage of placing a load on the synchronous motor. It was previously shown that a load would dampen the frequency change, but also that an attempt to apply that load to the motor in the rest position would prevent the motor starting.

By placing the load on the driven member with a resilient connection to allow the synchronous motor to begin operation, a further smoothing of the drive system is obtained. At small loads the motor behaves similar to a stepping motor, but at large loads the motion is like a flattened sinusoidal curve.

To move the magnetic head by means of the lead screw at a near constant velocity longitudinally along the magnetic stripe of the card being examined, the prime mover must produce a near constant angle of velocity. If, however, this cannot be accomplished, then another way must be found to achieve the desired result.

The flywheel is an obvious choice. However, the analysis shown of the type of synchronous motor used indicates that the motor cannot start loads rigidly attached to the shaft much larger than the moment of rotational inertia of the rotor itself. These two elements, flywheel and this type of motor, are not compatible under the obvious conditions.

The use of an elastic belt between the rotor of the synchronous motor and a flywheel on the end of the driven shaft, plus a negator to apply a work load, meets all requirements. First, this system allows the rotor to attain its synchronous speed almost under no load. As the elastic belt is stretched, it gradually pulls the flywheel mass up to synchronous speed. Secondly, the type of elastic material serves as a damper between pulsating rotor motion and flysheel mass. The prime purpose of the flywheel is then not to provide for constant motion of the magnetic pick-up head but rather to dampen out the rotational pulsations of the rotor as well as to provide the load in part.

It has therefore been discovered, that a very much improved card reading head is produced by the combination of elements described. The oscilloscope data of the drawings shows that when one studies the motion on a small scale, the word 'synchronous' applied to the drive motor does not necessarily mean what it normally implies, and the flywheel is not used as an energy storing device in the usual way rather it is used as a mass resisting the motion of the pulsating elastic belt.

Figure 12:
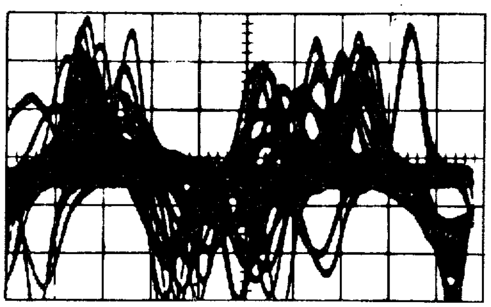
FIG. 12 is an oscilloscope picture of an output from a standard magnetic stripe recording read on a FIG. 1 device but without the flywheel negator shown on the drive screw.
Figure 13:
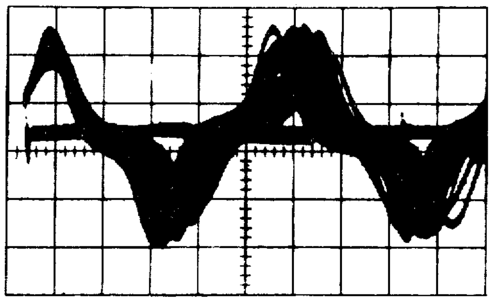
FIG. 13 is the oscilloscope picture from the same card after the flywheel negator was installed.

FIGS. 12 and 13 illustrate this last statement graphically. If a very small flywheel is employed on the end of the drive shaft, thereby damping out very little of the pulsations from the motor delivered to the elastic belt, then a magnetic card which has previously recroded at a very uniform interval, produces a very erratic pattern as shown in FIG. 12 wherein only five good reads were obtained out of 25 tries on the same card.

By contrast, FIG. 13 shows the uniformity of reading the same card with the flywheel enlarged enough to dampen the pulsations of the elastic spring drive imparted by the drive motor.

As can be appreciated, the negator spring continually biases the carriage mechanism to the left as viewed in FIGS. 1 and 2 to overcome the affects of any loose fit between the carriage and the drive screw as well as to apply a continuous load to the motor 32.

Figure 6:
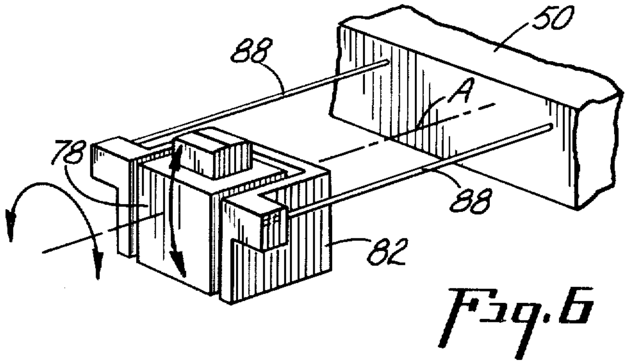
FIG. 6 is a pictorial view of the reading head mounting.
Figure 7:
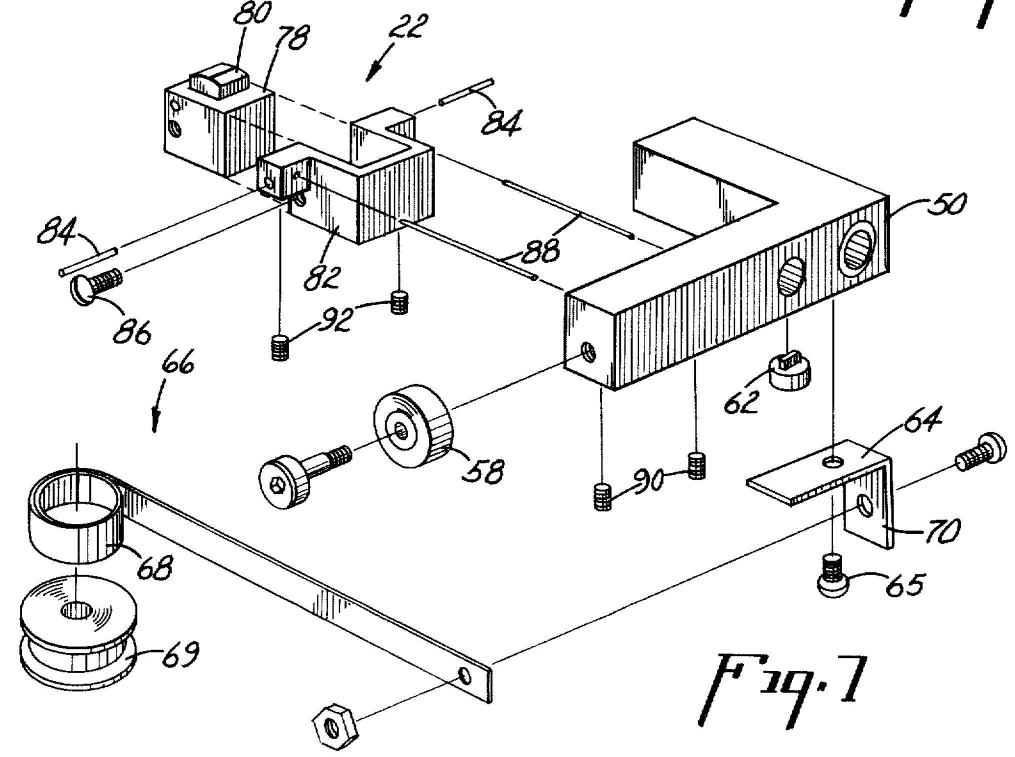
FIG. 7 is an exploded view of the reading head mounting and drive carriage assembly.

A further aspect of the subject embodiment which is particularly important is the manner in which the reading head is mounted from the carriage 50. As best shown in FIGS. 6 and 7 reading head assembly 22 includes a reading head 78. Reading head 78 is a conventional mangetic type of head having the usual magnetic gap 80. The magnetic head must be capable of certain limited movements so as to maintain the gap properly aligned and spaced with the magnetic stripe of the credit card being read. Different types of mounting arrangements have been proposed in the past. These generally have had certain disadvantages in that they were somewhat complex and contained linkages or the like which could, through wear or unsatisfactory manufacturing, produce some undesirable shifting and movement of the reading head. In the subject embodiment, the reading head 78 is mounted in a holder member 82 by pins 84 which extend into the head 78. A screw 86 extends through the side of the holder 82 and engages the head 78 to maintain it in a desired orientation relative to the holder. The head and holder assembly are carried from carriage 50 by a pair of spaced, generally parallel, spring members 88. Spring members 88 extend into openings formed in the carriage 50 and are locked therein by such set screws or the like 90. The outer ends of the springs 88 are similarly received in openings formed in the holder 82 and releasably locked therein by such screws 92. As can be seen, this mounting arrangement eliminates all pivoting or sliding joints or linkages. However, as illustrated in FIG. 6 the head can have two degrees of freedom to compensate irregularities in the magnetic stripe of the card. Note that it can rotate slightly about axis A. Also, it pivots somewhat about the end of springs 88.

Figure 5:
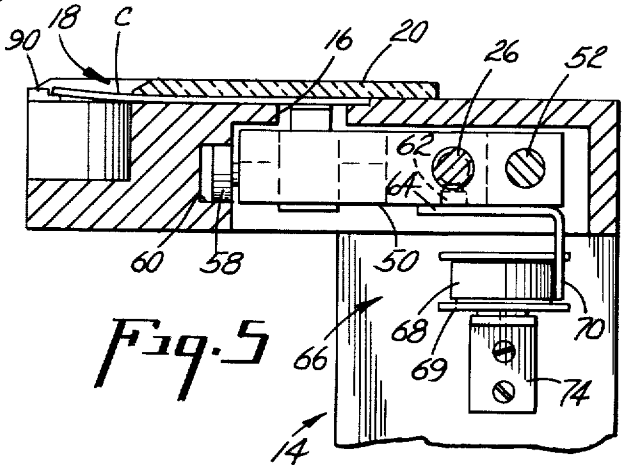
FIG. 5 is a cross-sectional view taken on line 5—5 of FIG. 2 showing the drive carriage mounting and compensator spring arrangement.

As previously mentioned, credit cards are often bowed which, of course, causes the magnetic stripe to be bowed. In the subject invention, this problem is overcome by the manner in which the credit card is held in position over the groove 16. Referring in particular to FIG. 5, it will be seen that the slot or recess 18 together with the cover plate 20 defines a narrow pocket into which a substantial portion of the credit card is closely received. Associated with the pockets are means to put a longitudinally extending deflection in the card. These means could take many forms but, in the subject device, comprise raised portions 89 and 90 formed along the front edge of the pocket. As seen in FIG. 5 when the card is received in the recess, the portions 89 and 90 deflect the outer longitudinal edge of the card upwardly. The magnetic stripe portion is thus forced down and caused to lie in a plane over the recess 16 and in proper relationship for engagement by the magnetic head 78.

What is claimed is:

1. Apparatus for driving a first member magnetic stripe encoded identification card and a second member read head in a transversely relative motion substantially free of speed variations, said apparatus including:

a rotary element adapted to impart a driving force to at least one of said first and second members;

a heavy flywheel pulley drivingly connected with said rotary drive element;

a permanent magnet synchronous motor having a pulley of little mass in comparison to said flywheel pulley carried on the output shaft thereof; and, an elastic belt drivingly interconnecting said lightweight pulley and said pulley-flywheel;

whereby, a synchronous motor having a cogging character may be caused to deliver an average and uniform drive to said drive shaft.

2. The apparatus of claim 1 wherein said rotary drive element comprises a lead screw.

3. The apparatus as defined in claim 2 including a carriage driven by said lead screw and carrying said second member.

4. The apparatus as defined in claim 3 including a spring assembly adapted to maintain said carriage under a continuous bias relative to said lead screw.

5. The apparatus as defined in claim 1 wherein said elastic belt comprises a stretchable, round section 0-ring.

6. The apparatus as defined in claim 1 wherein said second member comprises a magnetic gap type reading head.

7. The apparatus as defined in claim 3 wherein said carriage is guided for movement on said lead screw by a guide rod extending parallel to said lead screw and slidably engaging said carriage.

8. The apparatus as defined in claim 7 including a spring assembly for applying a continuous bias to said carriage in a direction parallel to said lead screw.

* * * * *